United States Patent
Kesselgruber

(10) Patent No.: US 8,256,775 B2
(45) Date of Patent: Sep. 4, 2012

(54) STABILIZER ASSEMBLY UNIT FOR A MOTOR VEHICLE

(75) Inventor: Dirk Kesselgruber, Duesseldorf (DE)

(73) Assignee: TRW Automotive GmbH, Alfdorf (DE)

( * ) Notice: Subject to any disclaimer, the term of this patent is extended or adjusted under 35 U.S.C. 154(b) by 683 days.

(21) Appl. No.: 11/992,357

(22) PCT Filed: Jul. 20, 2006

(86) PCT No.: PCT/EP2006/007154
§ 371 (c)(1),
(2), (4) Date: Aug. 4, 2009

(87) PCT Pub. No.: WO2007/033718
PCT Pub. Date: Mar. 29, 2007

(65) Prior Publication Data
US 2009/0302555 A1    Dec. 10, 2009

(30) Foreign Application Priority Data

Sep. 21, 2005  (DE) .................. 20 2005 014 926 U

(51) Int. Cl.
*B60G 17/015* (2006.01)

(52) U.S. Cl. .................................... 280/5.503

(58) Field of Classification Search ........... 280/5.502, 280/5.503, 5.506, 5.507, 5.508, 5.509, 124.103, 280/124.107
See application file for complete search history.

(56) References Cited

U.S. PATENT DOCUMENTS

| 4,593,920 A | 6/1986 | Natsume et al. |
| 5,184,702 A * | 2/1993 | Schulze et al. ............... 188/281 |
| 5,261,691 A | 11/1993 | Laichinger et al. |
| 6,851,679 B2 * | 2/2005 | Downey et al. ............ 280/5.511 |
| 7,055,832 B2 | 6/2006 | Germain |
| 2003/0205868 A1 | 11/2003 | Downey et al. |

FOREIGN PATENT DOCUMENTS

| DE | 41 15 593 A1 | 11/1992 |
| DE | 44 43 809 A1 | 4/1996 |
| DE | 197 56 505 A1 | 6/1999 |
| DE | 10 2005 045 177 A1 | 3/2007 |
| EP | 0 739 767 A1 | 10/1996 |
| EP | 0 980 772 A2 | 2/2000 |
| JP | 63020211 A | 1/1988 |
| WO | WO 02/083439 A1 | 10/2002 |

* cited by examiner

*Primary Examiner* — Faye M. Fleming
(74) *Attorney, Agent, or Firm* — MacMillan, Sobanski & Todd, LLC

(57) ABSTRACT

A stabilizer assembly unit for a motor vehicle, having a first fluid pressure actuator and a second fluid pressure actuator which are associated with opposite ends of an antiroll bar, characterized in that exactly one pressure fluid connection is provided on each of the fluid pressure actuators.

9 Claims, 1 Drawing Sheet

STABILIZER ASSEMBLY UNIT FOR A MOTOR VEHICLE

CROSS-REFERENCE TO RELATED APPLICATIONS

This application is a National Stage of International Application No. PCT/EP2006/007154 filed Jul. 20, 2006, the disclosures of which are incorporated herein by reference in their entirety, and which claimed priority to German Patent Application No. 20 2005 014 926.8 filed Sep. 21, 2005, the disclosures of which are incorporated herein by reference in their entirety.

BACKGROUND OF THE INVENTION

The invention relates to a stabilizer assembly unit for a motor vehicle, including a first fluid pressure actuator and a second fluid pressure actuator which are associated with opposite ends of an antiroll bar.

Such stabilizer assembly units are used in active chassis for suppressing or controlling the roll movements of the vehicle body in cornering. In these arrangements the use of an antiroll bar that is passive when taken by itself has been known for a long time. Such an antiroll bar is comprised of an elastic middle section that is rotatably attached to the vehicle body, and two levers that are connected to the wheel suspensions. Now if the vertical distance between the vehicle axle with which the antiroll bar is associated and the vehicle body changes on one vehicle side as compared to the other vehicle side, the antiroll bar is increasingly elastically tensioned as the change in distance increases. This results in a roll torque which attempts to urge the vehicle body into a position in which both ends of the vehicle axle have the same distance to the vehicle body.

A basic disadvantage of the sole use of such antiroll bars is that the latter impede cushioning movements of the axle on one side, which are for example necessary in the case of an uneven road on one side.

The active chassis already mentioned serve to solve this problem. In these active chassis, the chassis characteristics are changed with the aid of actuators in response to vehicle parameters and a particular traffic situation by, for example, pretensioning or relieving antiroll bars. This results in an improved adaptation of the vehicle to the respective traffic situation, such as an improved road grip when cornering.

DE 44 43 809 A1 discloses, for example, a stabilizer assembly unit including an antiroll bar that is configured in two parts and the ends of which may be tensioned with respect to one another by means of a hydraulic rotary drive. Such rotary drives have to be produced with close tolerances and sealed in a complicated manner. Therefore, they are expensive. They are, moreover, relatively maintenance-intensive and susceptible to faults in operation.

The generic document WO 02/083439 A1, and corresponding U.S. Pat. No. 7,055,832 B2, both of which are incorporated by reference herein, shows a stabilizer assembly unit including an antiroll bar which may be connected to the wheels via two linear hydraulic actuators. Each of the hydraulic actuators configured as a piston/cylinder unit disposes of two pressure connections via which the two cylinder chambers existing in each actuator may be acted upon with pressure. Provided for this purpose are one or several control valves, a plurality of hydraulic lines, and a hydraulic pump having a reservoir associated therewith, these components forming a comparatively complicated arrangement with a space requirement that should not be neglected.

BRIEF SUMMARY OF THE INVENTION

In contrast to the above prior art stabilizer assembly units, the present invention provides a stabilizer assembly unit that is distinguished by a simple construction and a considerably reduced space and may therefore be implemented at a particularly favorable price.

In a stabilizer assembly unit of the present invention, exactly one pressure fluid connection is provided on each of the fluid pressure actuators. In this manner a system is provided which is considerably simplified as compared to the prior art and may therefore be manufactured at low cost, and which is less susceptible to failure.

Preferably, the fluid pressure actuator is a linear fluid pressure actuator which is distinguished by a simple construction and therefore operates particularly reliably.

According to a preferred embodiment, the fluid pressure actuator is a hydraulic cylinder and the pressure fluid connection is a hydraulic connection. Hydraulic cylinders are standard components which are available at low cost.

Advantageously, the hydraulic cylinder has a return element that is disposed in an interior space of the hydraulic cylinder. Such an arrangement offers the advantage of a particularly small space required.

Preferably, the hydraulic cylinder includes a piston which is urged into a neutral position by the return element. Therefore, only one hydraulic connection is required to move the piston into an extended position, since the piston may be returned to the neutral position by the return element. Since, moreover, the neutral position is not restricted to a central position of the piston, as customary with hydraulic cylinders in other arrangements, it is possible to obtain a hydraulic cylinder that is distinguished by a particularly small axial dimension by appropriately selecting the piston neutral position.

Advantageously, the piston divides the interior space of the hydraulic cylinder into a first chamber and a second chamber, the first chamber being connected to a source via the hydraulic connection, and the second chamber being under atmospheric pressure. Thus, when the hydraulic cylinder is suitably configured, with the piston rod extending in and out of the second chamber, a sealing arrangement around the piston rod is not required, which renders the production of the hydraulic cylinder particularly simple and cost-effective.

The return element may be disposed in the first chamber. In this manner the second chamber may completely be used for the piston travel.

According to a preferred embodiment, the return element is a helical spring which is a reliable, almost maintenance-free but still low-priced component.

Preferably, a valve is provided for actuating both fluid pressure actuators, the valve being arranged between a pressure source and the pressure fluid connections. Thus, a hydraulic system of a particularly simple construction is obtained, which has a minimum of components and in which the single valve provided controls the entire system.

Advantageously, the valve has a neutral position and two actuating positions, one fluid pressure actuator each being actuated in each actuating position. Thereby, an uncomplicated arrangement materializes, whose susceptibility to failure is low.

According to a preferred embodiment, in the neutral position of the valve, both fluid pressure actuators are connected to a reservoir of the pressure source. This allows an exchange of pressure of the fluid pressure actuators both with the reservoir and among each other, whereby the mechanical antiroll bar is bridged in the neutral position.

Other advantages of this invention will become apparent to those skilled in the art from the following detailed description of the preferred embodiments, when read in light of the accompanying drawings.

DETAILED DESCRIPTION OF THE INVENTION

Figure 1:
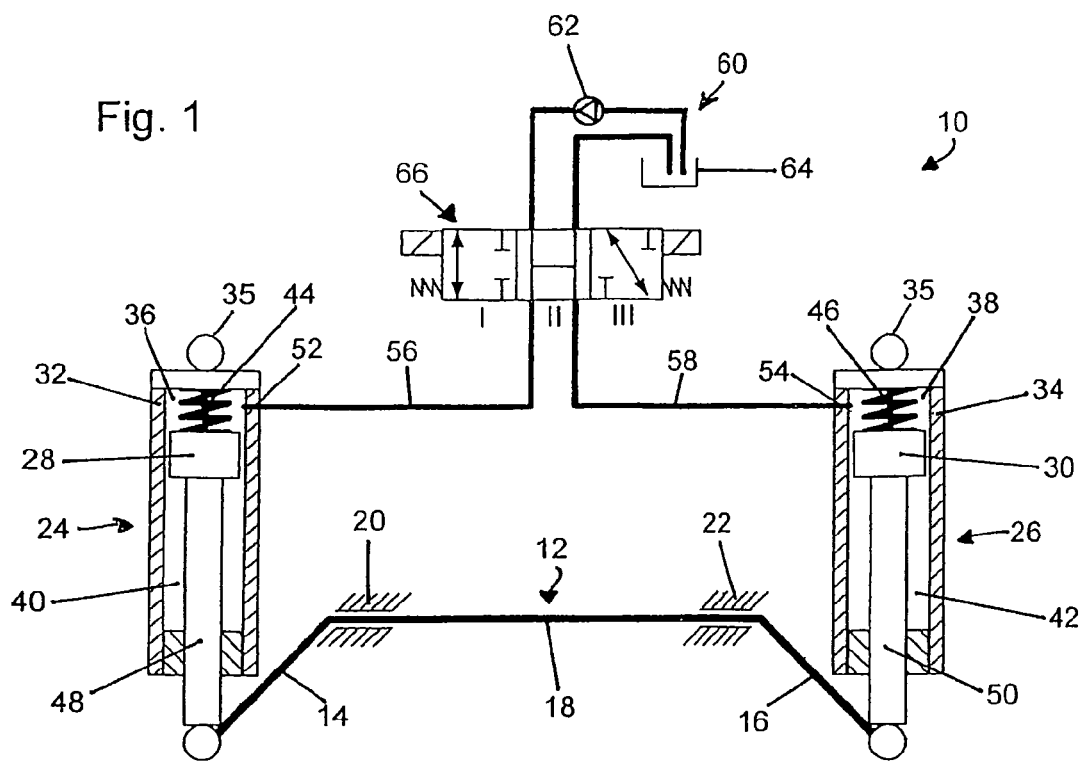
FIG. 1 shows a schematic representation of a stabilizer assembly unit in accordance with the invention in a neutral position.

FIG. 1 schematically shows a stabilizer assembly unit 10 having an antiroll bar 12 for a vehicle axle. The antiroll bar 12 includes a lever arm 14 on the left in the figure, a lever arm 16 on the right in the figure, and a middle section 18. The middle section 18 is mounted so as to be rotatable about its longitudinal axis in two bearings 20 and 22 on the vehicle body, whilst the two lever arms 14 and 16 are connected to one linear fluid pressure actuator each in the form of a hydraulic cylinder 24 and 26, respectively.

Each hydraulic cylinder 24 and 26 comprises a piston 28 and 30, respectively, and a cylinder body 32 and 34, respectively, the pistons 28 and 30 being attached to the lever arms 14 and 16, respectively, of the antiroll bar 12, and the cylinder bodies 32 and 34 being connectable to the respective wheel suspension. Thus, the hydraulic cylinders 24 and 26 replace the connecting rods which are normally provided and which connect the lever arms 14 and 16 of the antiroll bar 12 to the wheel suspensions of the vehicle. The wheels, not illustrated, are thus connected to fastening points 35.

By means of the pistons 28 and 30 the interior spaces of the cylinder bodies 32 and 34 are each divided into a first chamber 36 or 38 and a second chamber 40 or 42. Disposed in the first chambers 36 and 38 is a return element in the form of a helical spring 44 and 46, respectively, which couples the respective piston 28 or 30 to the associated cylinder body 32 or 34.

In this arrangement, the second chambers 40 and 42, in which rod sections 48 and 50, respectively, of the pistons 28 and 30, respectively, extend, are not sealed with respect to the atmosphere, and are consequently under atmospheric pressure. The first chambers 36 and 38, on the other hand, are sealed by the pistons 28 and 30, respectively, and communicate with a pressure source 60 via pressure fluid connections, more precisely via hydraulic connections 52 and 54, respectively, and associated hydraulic lines 56 and 58, respectively.

The pressure source 60 comprises a hydraulic pump 62 and a pressureless reservoir 64. A valve 66 for controlling the stabilizer assembly unit 10 is provided between the hydraulic cylinders 24 and 26 and the pressure source 60. The valve 66, which may for example be a solenoid valve, has a neutral position II and two actuating positions I and III. In the neutral position II, both hydraulic cylinders 24 and 26 are connected to the reservoir 64.

In the state of the stabilizer assembly unit 10 shown in FIG. 1, both the valve 66 and the two hydraulic cylinders 24 and 26 are in the neutral position. The neutral position of the pistons 28 and 30 is determined by the springs 44 and 46, respectively, the neutral position of the pistons 28 and 30 being selected in the embodiment shown such that in the neutral position the first chambers 36 and 38 are of considerably smaller dimensions than the second chambers 40 and 42. Thereby, the pistons 28 and 30 dispose of almost twice the stroke length than would be the case with a conventional linear actuator in which in the neutral position the piston is arranged in the center, the overall size of the hydraulic cylinders 24 and 26 being the same.

Figure 2:
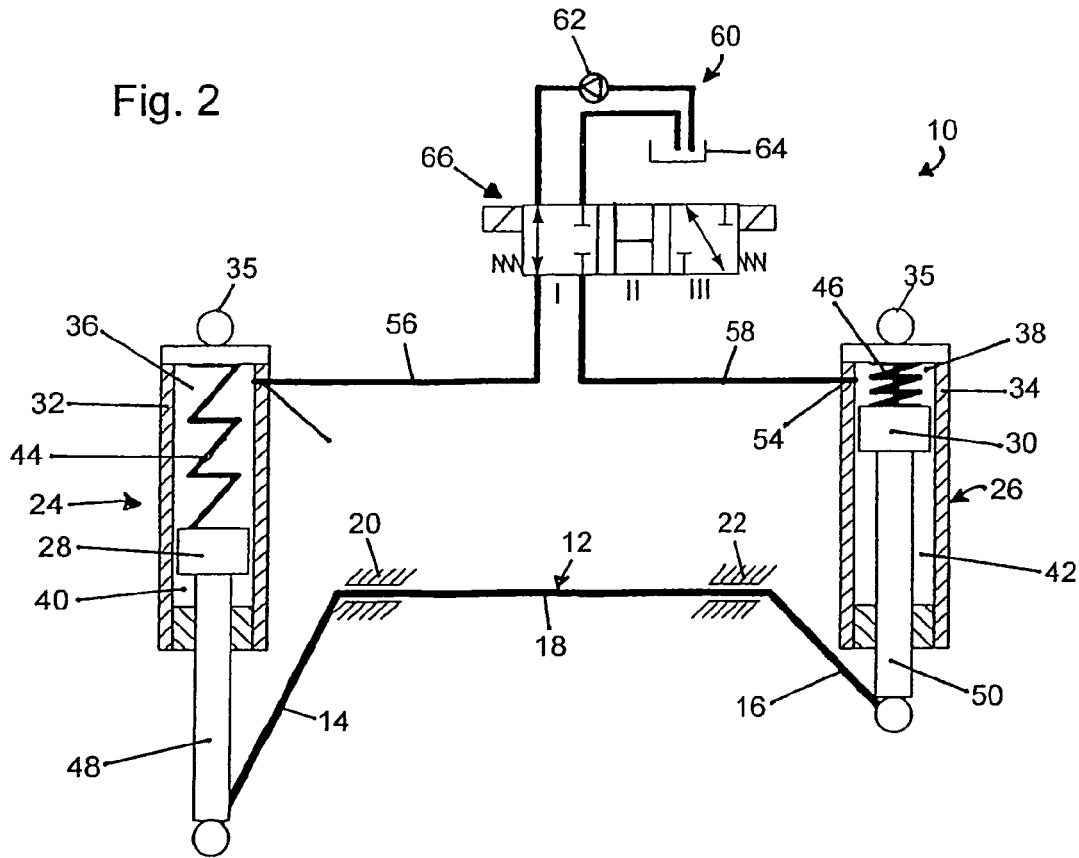
FIG. 2 shows a schematic representation of the stabilizer assembly unit of FIG. 1 in an actuating position.

Now if a situation arises in which an increase in the distance between the vehicle body and the wheel associated with the lever arm 14, on the left in the figure, of the antiroll bar 12 is required, the valve 66 is switched to the actuating position I shown in FIG. 2. Thereby, the first chamber 36 of the hydraulic cylinder 24 on the left in the figure is acted upon with pressure via the hydraulic connection 52, whereby the piston 28 shifts downwards against the atmospheric pressure prevailing in the second chamber 40, whereas the hydraulic cylinder 26 on the right in the figure is blocked in its neutral position. In so doing, the pressurized hydraulic cylinder 24 rotates the antiroll bar 12, which permits to provide a controlled roll torque to the vehicle body.

The hydraulic cylinder 26 on the right in the figures may analogously be actuated by switching the valve 66 to the actuating position III, the left hydraulic cylinder 24 being then blocked in its neutral position.

Upon switching the valve 66 to the neutral position II, the respective piston 28 or 30 displaced is returned on account of the return force of the spring 44 or 46 and the forces acting on the vehicle from the outside.

In accordance with the provisions of the patent statutes, the principle and mode of operation of the invention have been explained and illustrated in its preferred embodiment. However, it must be understood that this invention may be practiced otherwise than as specifically explained and illustrated without departing from its spirit or scope.

The invention claimed is:

1. A stabilizer assembly unit for a motor vehicle, comprising:
   an antiroll bar having first and second ends with the second end opposite from the first end;
   a first fluid pressure actuator associated with the first end of the antiroll bar the first fluid pressure actuator being a hydraulic cylinder having a cylinder body and a piston disposed within the cylinder body;
   a second fluid pressure actuator associated with the second end of the antiroll bar the second fluid pressure actuator having a cylinder body and a piston disposed within the cylinder body;
   a return element disposed within an interior space of each of the first and second fluid pressure actuators, the return elements coupling the pistons to the hydraulic cylinder bodies; and
   exactly one pressure fluid connection provided on each of the fluid pressure actuators.

2. The stabilizer assembly unit according to claim 1, wherein the fluid pressure actuators are linear fluid pressure actuators.

3. The stabilizer assembly unit according to claim 2, wherein the hydraulic cylinder includes a piston which each piston within the hydraulic cylinder is urged into a neutral position by the corresponding return element.

4. The stabilizer assembly unit according to claim 3, wherein each piston divides the interior space of the corresponding hydraulic cylinder into a first chamber and a second chamber, the first chamber being connected to a pressure source via the hydraulic connection, and the second chamber being under atmospheric pressure.

5. The stabilizer assembly unit according to claim 4, wherein each return element is disposed in the first chamber of the corresponding hydraulic cylinder.

6. The stabilizer assembly unit according to claim 1, wherein each return element is a helical spring.

7. The stabilizer assembly unit according to claim 1 wherein a valve for actuating both fluid pressure actuators is disposed between a pressure source and the pressure fluid connections.

8. The stabilizer assembly unit according to claim 7, wherein the valve has a neutral position and two actuating positions, one fluid pressure actuator each being actuated in each actuating position.

9. The stabilizer assembly unit according to claim 8, wherein in the neutral position of the valve, both fluid pressure actuators are connected to a reservoir of the pressure source.

* * * * *